(12) United States Patent
Tanaka

(10) Patent No.: US 8,687,958 B2
(45) Date of Patent: Apr. 1, 2014

(54) INTELLIGENT OPTICAL MODULE CAPABLE OF RESTARTING REMOTELY FROM HOST SYSTEM

(75) Inventor: Yasuhiro Tanaka, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 153 days.

(21) Appl. No.: 13/529,697

(22) Filed: Jun. 21, 2012

(65) Prior Publication Data

US 2012/0328285 A1 Dec. 27, 2012

(30) Foreign Application Priority Data

Jun. 24, 2011 (JP) .................................. 2011-140873

(51) Int. Cl.
*H04B 10/00* (2013.01)
*H04B 10/06* (2011.01)
*H04B 17/00* (2006.01)

(52) U.S. Cl.
USPC ............. 398/25; 398/138; 398/139; 398/202; 398/214

(58) Field of Classification Search
USPC ............... 398/16, 22, 25, 106, 107, 113, 135, 398/138, 139, 164
See application file for complete search history.

(56) References Cited

U.S. PATENT DOCUMENTS

| | | | |
|---|---|---|---|
| 7,860,399 B2* | 12/2010 | Hsieh | 398/151 |
| 7,949,025 B2* | 5/2011 | Olea | 372/38.02 |
| 2006/0215545 A1* | 9/2006 | Nelson | 370/216 |
| 2013/0136445 A1* | 5/2013 | El-Ahmadi et al. | 398/22 |

FOREIGN PATENT DOCUMENTS

JP 2010-278774 A 12/2010

* cited by examiner

*Primary Examiner* — Dalzid Singh
(74) *Attorney, Agent, or Firm* — Global IP Counselors, LLP

(57) ABSTRACT

An intelligent optical module to restart itself according to a command sent from the host system is disclosed. The optical module may distinguish the first state, where no optical signal is received, from the second state, where a substantial optical signal but unmodulated is received. The optical module is restarted when the second state appears with a preset pattern.

4 Claims, 6 Drawing Sheets

INTELLIGENT OPTICAL MODULE CAPABLE OF RESTARTING REMOTELY FROM HOST SYSTEM

BACKGROUND OF THE INVENTION

1. Field of the Invention

The present invention relates to an optical module having a function to generate a resume signal.

2. Related Background Arts

A Japanese Patent Application published as JP-2010-278774A has disclosed a system in which a host is coupled with a peripheral apparatus via an optical fiber. The system disclosed therein, when the peripheral apparatus is unable to restart regularly, sends an optical signal in a burst mode from the host system, and then the peripheral apparatus may be regularly restarted.

SUMMARY OF THE INVENTION

One aspect of the invention relates to an optical module able to communicate with a host system. The optical module includes an optical receiver, a first detector, a second detector and a restart controller. The optical receiver may receive an optical signal from the host system. The first detector may detect the first status of the optical signal where the optical signal shows a substantial level. The second detector may detect the second status where the optical signal is unmodulated. A feature of the present optical module is that, when the second status appears in accordance with a preset pattern during the first status continues; the optical module may restart itself.

Because the optical module watches the second status of the optical signal where the optical signal has a substantial level but unmodulated, the unintentional restart due to, for instance, a physical manipulation for the optical fiber, a miss-setting of an optical connector, and so on, may be effectively escaped.

Another aspect of the invention relates to a method to restart an optical module remotely from a host system. The method includes steps of: (a) detecting a first status of an optical signal provided from the host system, where an optical signal with a substantial level is input to the optical module in the first status; (b) detecting a second status of the optical signal where the optical signal has the substantial level but unmodulated; (c) identifying an appearance of the seconds status with a preset pattern; and (d) restarting the optical module when the appearance of the second status matches with the preset pattern.

BRIEF DESCRIPTION OF THE DRAWINGS

The invention will be described in further detail with reference to the attached drawings in which.

DESCRIPTION OF PREFERRED EMBODIMENTS

Next, some embodiments according to the present invention will be described as referring to accompanying drawings. In the description of the drawings, the numerals or symbols same or similar to each other will refer to the elements same or similar to each other without overlapping explanations.

Figure 1:
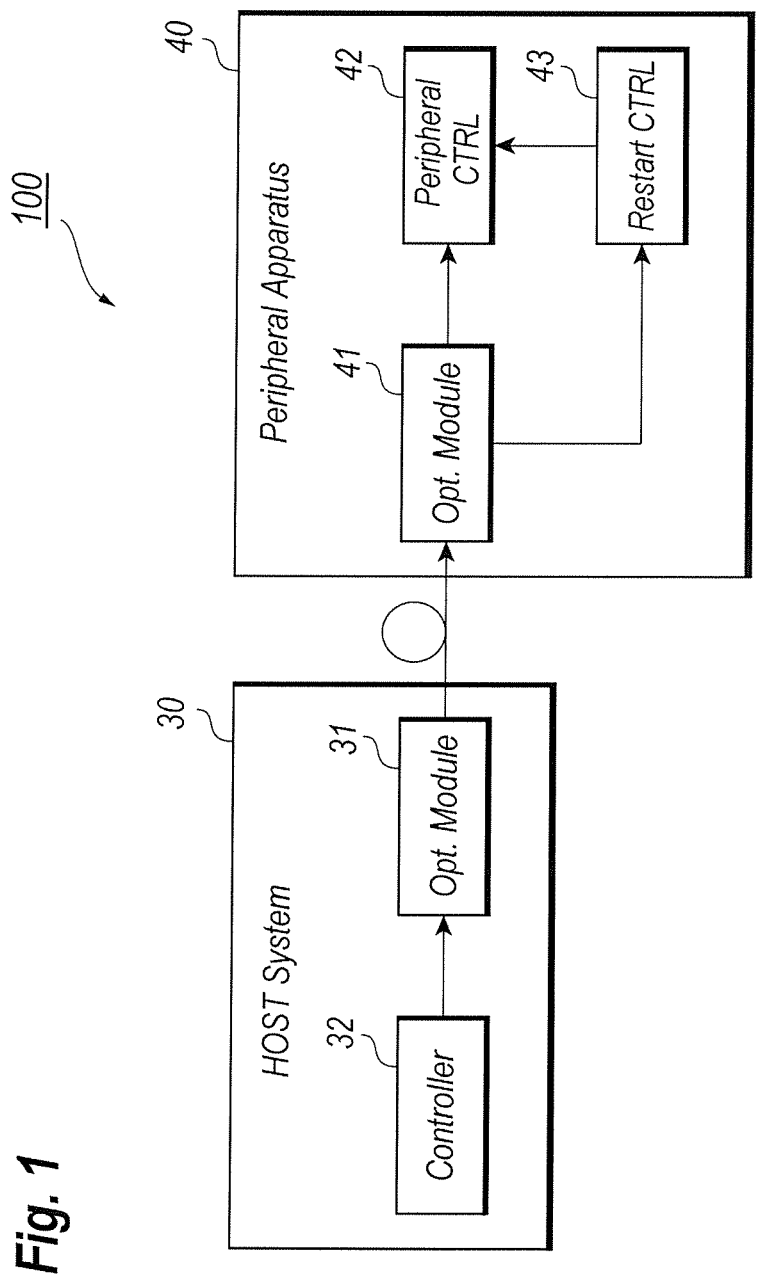
FIG. 1 is a block diagram of a system with a peripheral apparatus remotely controllable from the host system.

A system including a host system and a peripheral apparatus comparable to an embodiment of the invention will be first described. FIG. 1 shows a functional block diagram of such comparable example where the host system 30 is coupled with a peripheral apparatus 40 via an optical fiber. The host system 30 includes an optical module 31 and a controller 32, while the peripheral apparatus 40 includes an optical module 41, a controller 42 and a restart controller 43.

Figure 2:
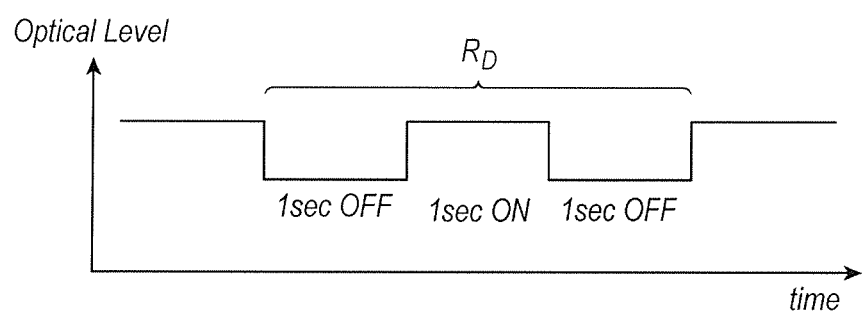
FIG. 2 schematically shows an optical signal with a comparable mode, which is provided from the host system to the peripheral apparatus for restarting the peripheral apparatus.
Figure 3:
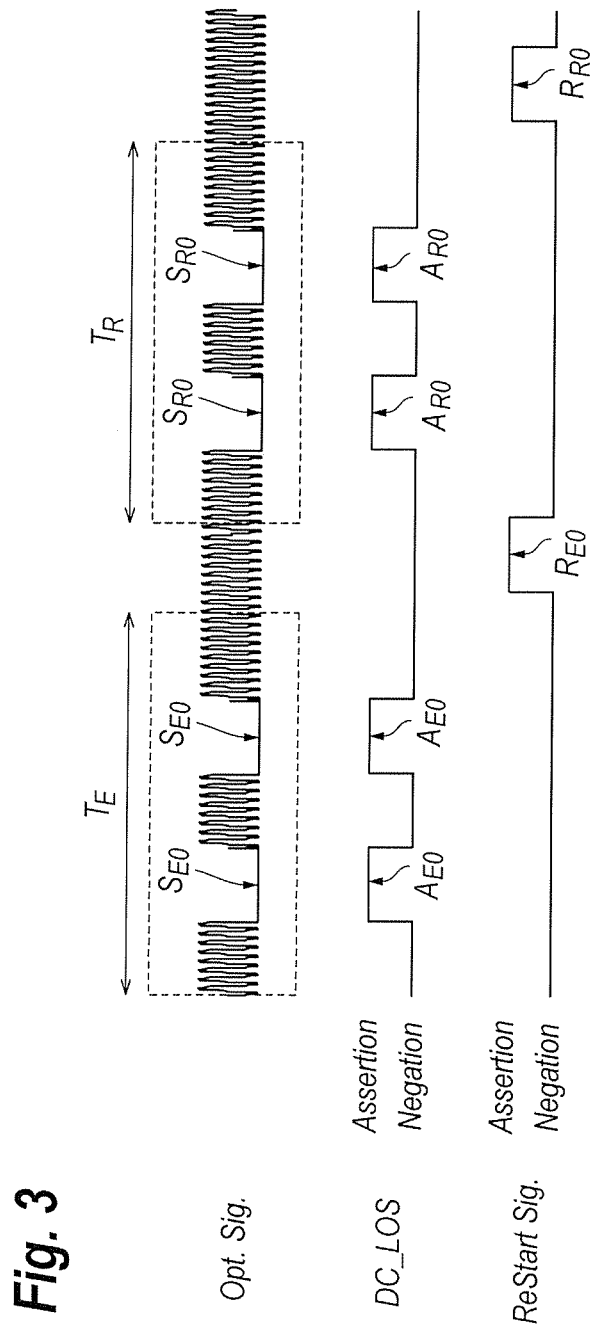
FIG. 3 shows timing charts of the optical signal, DC_LOS, and the restart signal for a comparable optical module.

The host system 30 may restart the peripheral apparatus 40 under the control of the controller 32 by transmitting an optical signal from the optical module 31 in the host system 30 to the peripheral apparatus 40. The peripheral apparatus 40, receiving the optical signal from the host system 30 by the optical module 41, transmits the command from the host system 30 to the peripheral controller 42. When the peripheral controller 42 falls in a failure, or makes an error to start the peripheral apparatus 40, the host system 30 is necessary to restart the peripheral controller 42 remotely. Conventionally, the host system 30 may restart the peripheral controller 42 by iterating a break and a resumption of the optical signal. FIG. 2 shows a typical example of the optical signal to restart the peripheral controller 42. Specifically, the host system 30 may output an optical signal with a substantial level for 1 second duration accompanied with a break for 1 second prior and posterior to the substantial level.

The optical module 41 in the peripheral apparatus 40 has a function to detect an optical level and to decide whether the optical signal is broken, which is often defined as "DC_LOS" (DC Loss Of Signal). The restart controller 43 in the peripheral apparatus 40, receiving DC_LOS from the optical module 41, may restart the peripheral controller 42.

A comparable system thus described may restart the peripheral apparatus 40 via an optical medium. However, the optical medium, namely, an optical fiber or an optical connector attached to the optical fiber fallen in a failure, and/or the physical manipulation affected to optical fiber may sometimes cause an optical signal iterating a substantial level for one second with a break for another one second. When such behaviors of the optical signal in a part thereof match with a preset pattern to restart the peripheral apparatus 40, the peripheral apparatus 40 may unintentionally restart the operation thereof.

Figure 4:
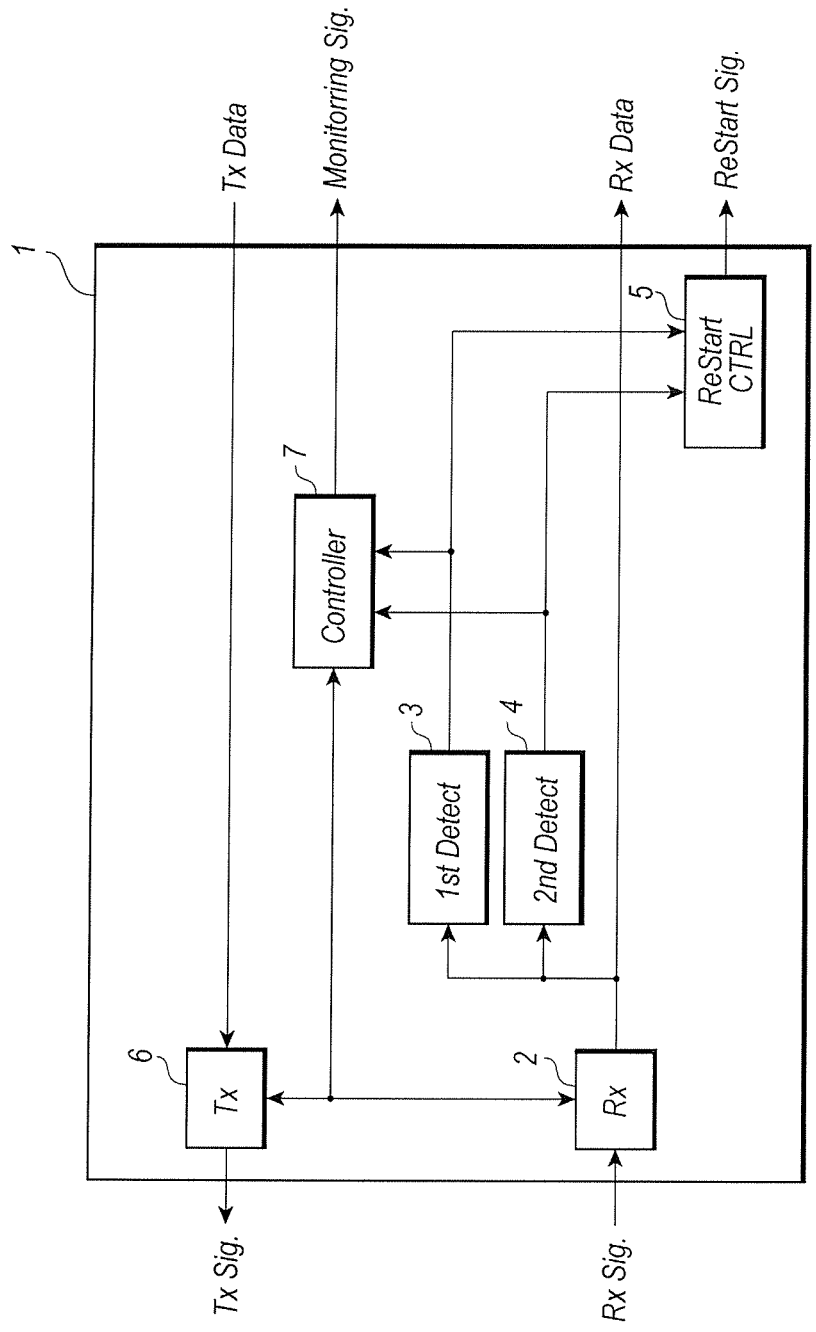
FIG. 4 is a functional block diagram of an optical module according to the embodiment of the invention.

FIG. 4 is a functional block diagram of an optical module 1 according to an embodiment of the invention, which is installed in the peripheral apparatus 40 shown in FIG. 1. The optical module 1 is configured such that it is connected to the host system 30 through the optical fiber as shown in FIG. 1. The optical module 1 includes a receiver 2 that includes a photodiode (PD) and a trans-impedance amplifier (hereafter TIA), a transmitter 6 that includes an LD (laser diode) and a LD-driver, a first detector 3 to detect a state of the LOSS-OF-SIGNAL (LOS) in a DC more or a low frequency (LF) mode, a second detector 4 to detect another LOS in a AC mode or a radio frequency (RF) mode, a restart controller 5 to generate a restart signal, and a monitor controller 7.

The PD in the receiver 2 may convert an input optical signal coming from the host system 30 into a photocurrent, while, the TIA also provided in the receiver 2 may convert the photocurrent into a voltage signal. The receiver 2 may output thus converted voltage signal not only to the first and second detectors, 3 and 4, but to the outside of the optical module 1 as a received data.

The first detector 3 detects a DC or LF level of the voltage signal provided from the receiver 2. The first detector 3 may output a signal "DC_LOS" to the monitor controller 7 and the restart generator 5 when the received data is less than a first threshold in a DC level thereof. The DC_LOS is asserted by the monitor controller 7 when the received data becomes less than the first threshold.

The second detector 4 detects amplitude of the voltage signal provided from the receiver 2. When the voltage signal has the amplitude thereof less than a second threshold, the second detector 4 may assert a signal "AC_LOS" and send the AC_LOS to the monitor controller 7 and the restart controller 5.

Figure 5:
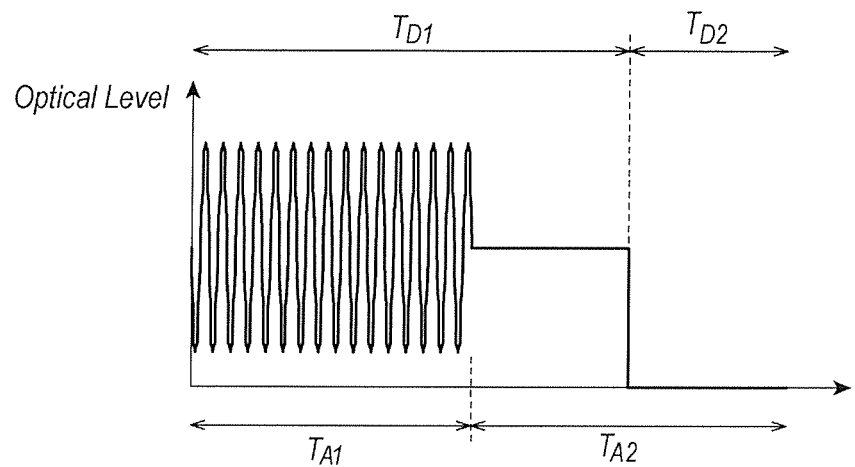
FIG. 5 describes statuses of DC_LOS and AC_LOS against a behavior of the optical signal according to the embodiment of the invention.

FIG. 5 describes how DC_LOS and AC_LOS are asserted for the input optical signal. The input optical signal in the DC level thereof is higher than the first threshold in a period $T_{D1}$, but less than the first threshold in another period $T_{D2}$. Accordingly, the first detector 3 may negate DC_LOS in the period $T_{D1}$ but assert in the period $T_{D2}$. On the other hand, the optical signal shown in FIG. 5 has a substantial amplitude in a period $T_{A1}$, while, AC components thereof disappear in another period $T_{A2}$. Accordingly, the second detector 4 may negate AC_LOS in the period $T_{A1}$, while, may assert it in the other period $T_{A2}$.

The optical module 1, as described later in this specification, may output the restart signal when DC_LOS is negated and AC_LOS is asserted. That is, the former corresponds to the period $T_{D1}$, while, the latter corresponds to the period $T_{A2}$, and the restart condition appears in a period where $T_{D1}$ and $T_{A2}$ are overlapped. Because the optical module 1 detects the optical signal in the DC mode and the AC mode, misconduct of the restart signal due to, for instance, physical or mechanical treatment for the optical fiber may be escaped.

Figure 6:
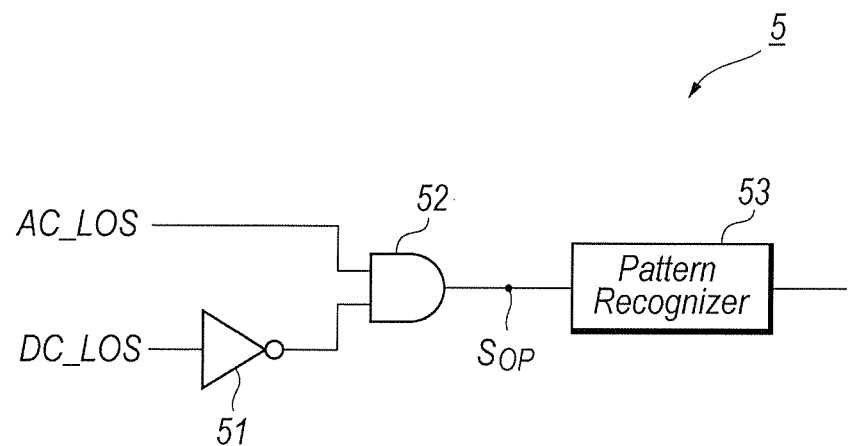
FIG. 6 is an example of the restart controller according to an embodiment of the invention.

The restart controller 5 may generate the restart signal when a state of the negation of DC_LOS and the assertion of AC_LOS is appeared in a predetermined manner. FIG. 6 shows an example of the restart controller 5, where the restart controller 5 may include an inverter 51, an AND gate 52, and a pattern recognizer 53. The inverter 51 may invert DC_LOS provided from the first detector 3 and transfer the inverted DC_LOS, which may be denoted as /DC_LOS where a character "/" means a signal subsequent thereto is inverted, to the AND gate. The AND gate 52 may make a logical product between AC_LOS and /DC_LOS to generate a signal $S_{OP}$. That is, signal $S_{OP}$ may be asserted when /DC_LOS is asserted (DC_LOS is negated) and AC_LOS is asserted.

The pattern recognizer 53 may generate the restart signal when $S_{OP}$ appears according to the preset manner. For instance, the preset manner may be a state where the assertion with a period of 1 second appears twice with an interval of 1 second.

Figure 7:
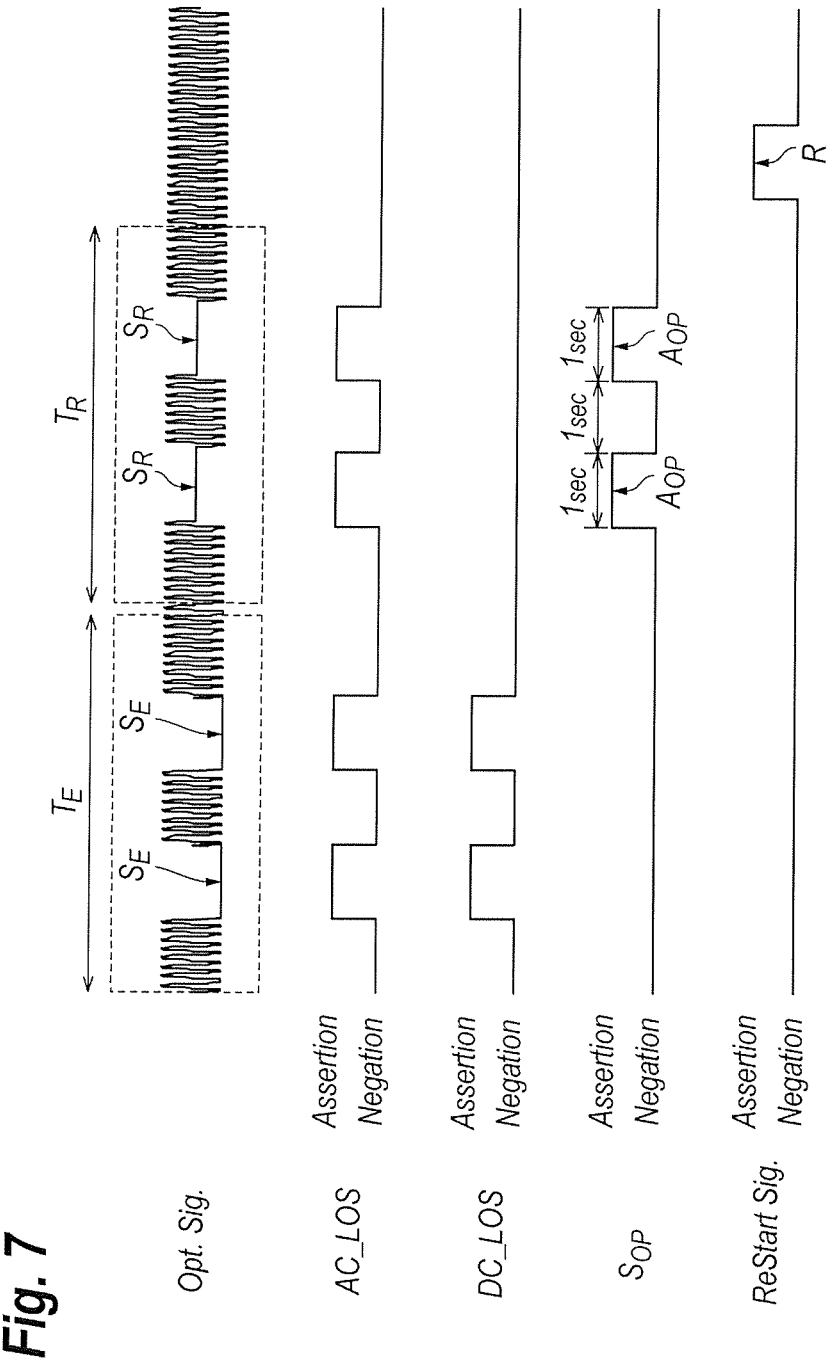
FIG. 7 shows timing charts of the optical signal, DC_LOS, AC_LOS, the pattern signal $S_{OP}$, and the restart signal according to an embodiment of the invention.

FIG. 7 shows practical timing chart of the input optical signal, DC_LOS, AC_LOS, the $S_{OP}$, and the restart signal. In a period $T_E$, some failures caused in the optical fiber frequently break the optical signal to show a status $S_E$ where the optical signal loses both the level and the modulation thereof. During the period $S_E$, both of DC_LOS and AC_LOS are asserted, but the signal $S_{OP}$ stays to be negated, and the restart signal is not generated. A comparable optical module 41 malfunctions to generate the restart signal based on only the optical level, DC_LOS.

On the other hand, a system coupled with the optical module 1 of the embodiment commands to restart the peripheral apparatus 40 controlled by the system during a period $T_R$. That is, the optical signal with no modulation but with substantial level is appeared during periods $S_R$. Accordingly, during this period $S_R$, AC_LOS is asserted but DC_LOS is negated. Then, the signal $S_{OP}$ may be asserted during the periods $S_R$. Moreover, the duration of the status $S_R$ where the optical signal is not modulated but keeps a substantial level is about 1 second and this status $S_R$ is repeated with 1 second halt, the optical module 1 of the embodiment may generate the restart signal.

The predetermined pattern for the status $S_R$, twice appearance with 1 second duration and 1 second halt, may be programmable. For instance, another pattern of four times appearance with half second duration and half second halt may be applicable. Such patterns may be pre-settable in the pattern recognizer 53 through the controller 7.

In an alternative, the pattern recognizer 53 may have a plurality of preset patterns for the signal $S_{OP}$, and select one of the patterns depending on a command provided from the controller 7. When the host system 30 may communicate with a plurality of peripheral apparatus 40 in parallel, and each peripheral apparatus 40 has an optical module 1 of the present embodiment, the host system 30 may select one of the peripheral apparatus 40 to be restarted by sending the preset pattern specific to this peripheral apparatus 40.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An optical module configured to communicate with a host system, the optical module comprising:
    an optical receiver for receiving an optical signal from the host system;
    a first detector for detecting a first status where the optical signal has a substantial level;
    a second detector for detecting a second status where the optical signal is un-modulated;
    a restart controller for restarting the optical module when the optical signal iterates the second status with a preset pattern during the first status continues.

2. The optical module of claim 1,
    wherein the preset pattern is programmable.

3. The optical module of claim 1,
    wherein the optical module prepares a plurality of patterns for the second status, one of which is selected as the preset pattern.

4. A method to restart an optical module that communicates optically with a host system, comprising steps of:
    detecting a first status where an optical signal with a substantial level is input to the optical module;
    detecting a second status where the optical signal has a substantial level but un-modulated;
    identifying an appearance of the second status with a preset pattern; and restarting the optical module when the appearance of the second status matches with the preset pattern.

* * * * *